(12) United States Patent
Tsukada (10) Patent No.: US 8,107,725 B2
(45) Date of Patent: Jan. 31, 2012

(54) IMAGE PROCESSOR AND IMAGE PROCESSING METHOD

(75) Inventor: Akihiro Tsukada, Kanagawa (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 619 days.

(21) Appl. No.: 12/325,444

(22) Filed: Dec. 1, 2008

(65) Prior Publication Data

US 2009/0154799 A1 Jun. 18, 2009

(30) Foreign Application Priority Data

Nov. 30, 2007 (JP) ................. P2007-310991

(51) Int. Cl.
*G06K 9/00* (2006.01)
(52) U.S. Cl. ....................................... 382/165
(58) Field of Classification Search .............. 382/165, 382/154, 164, 173
See application file for complete search history.

(56) References Cited

U.S. PATENT DOCUMENTS

| 5,587,927 | A | 12/1996 | Nagao et al. |
| 5,933,546 | A | 8/1999 | Stone |
| 6,434,256 | B1 | 8/2002 | Yeo |
| 6,608,929 | B1 | 8/2003 | Shiratani |

FOREIGN PATENT DOCUMENTS

| JP | 5174149 | | 7/1993 |
| JP | 6282651 | | 10/1994 |
| JP | 7093561 | | 4/1995 |
| JP | 8055133 | | 2/1996 |
| JP | 9050532 | A | 2/1997 |
| JP | 9327037 | A | 12/1997 |
| JP | 10055433 | | 2/1998 |
| JP | 2000259999 | | 9/2000 |
| JP | 2000339453 | | 12/2000 |
| JP | 2003334194 | | 11/2003 |
| JP | 2005234904 | A | 9/2005 |
| JP | 2006202184 | A | 8/2006 |

OTHER PUBLICATIONS

Japanese Office Action from Application No. 2007-310991 dated Oct. 23, 2009.
Japanese Office Action from Application No. 2007-310991 dated Jan. 22, 2010.
Notice of Decision to Grant a Patent from Application No. 2007-310991 dated Apr. 19, 2010.

*Primary Examiner* — Claire X Wang
(74) *Attorney, Agent, or Firm* — Gifford, Krass, Sprinkle, Anderson & Citkowski, P.C.

(57) ABSTRACT

An image processor according to the present invention is configured to generate a plurality of multiresolution images of different resolutions from an input image (S16), to set a correlation evaluation function for each multiresolution image, calculate a correlation value between the correlation evaluation function and each pixel in the multiresolution image, and extract a position of a local region on the basis of the correlation value (S18), and to set a size of the local region according to the resolution of the multiresolution image (S22), and to detect an object in the local region. This enables extraction of the local region at an appropriate position and in an appropriate range for a characteristic portion of the input image. For this reason, a target range is appropriately limited and detection of the object is quickly carried out without deterioration of accuracy.

9 Claims, 11 Drawing Sheets

IMAGE PROCESSOR AND IMAGE PROCESSING METHOD

CROSS REFERENCE TO RELATED APPLICATIONS

This application claims priority of Japanese Patent Application 2007-310991 filed Nov. 30, 2007.

BACKGROUND OF THE INVENTION

1. Field of the Invention

The present invention relates to an image processor and image processing method to perform image processing such as extraction of a contour of an object.

2. Related Background Art

A hitherto-known image processor to perform image processing such as extraction of a contour of an object is configured, as described in Japanese Patent Application Laid-open No. 2003-334194, to acquire image data, divide the image data into a plurality of small regions, calculate evaluation values indicating clarity of the image for the respective small regions, select some small regions on the basis of the evaluation values, and combine the selected small regions to extract the contour of the object.

SUMMARY OF THE INVENTION

With the apparatus of this configuration, it is, however, difficult to increase the image processing speed while maintaining the accuracy of recognition of the object. For example, if the image processing is carried out using the small regions set small, the object recognition accuracy is improved, while the burden of processing becomes so great as to result in failure in quick processing. On the other hand, if the image processing is carried out using the small regions set large, the number of small regions is reduced to relieve the processing burden, so as to increase the processing speed, while the object recognition accuracy degrades.

The present invention has been accomplished in order to solve the technical problem as described above, and an object of the present invention is to provide an image processor and image processing method capable of enhancing the image processing speed while maintaining the object recognition accuracy.

Specifically, an image processor according to the present invention comprises a multiresolution image acquiring unit to acquire a plurality of multiresolution images of different resolutions from an input image; a local region extracting unit to set a correlation evaluation function for each of the multiresolution images, calculate a correlation value between the correlation evaluation function and each pixel in the multiresolution image, extract a position of a local region, based on the correlation value, and set a size of the local region according to the resolution of the multiresolution image; and an object detecting unit to detect an object in the local region. An image processing method according to the present invention comprises a multiresolution image acquiring step to acquire a plurality of multiresolution images of different resolutions from an input image; a local region extracting step to set a correlation evaluation function for each of the multiresolution images, calculate a correlation value between the correlation evaluation function and each pixel in the multiresolution image, extract a position of a local region, based on the correlation value, and set a size of the local region according to the resolution of the multiresolution image; and an object detecting step to detect an object in the local region.

According to this invention, extraction of the object in the input image is carried out by acquiring the multiresolution images from the input image, calculating the correlation value between each pixel in each multiresolution image and the correlation evaluation function, extracting the position of the local region on the basis of the correlation value, and setting the size of the local region according to the resolution of the multiresolution image, whereby the local region can be extracted at an appropriate position and in an appropriate range for a characteristic portion of the input image. For this reason, a target range is appropriately limited and the detection of the object is quickly performed without degradation of accuracy.

When the object detection is carried out by also setting the local region for the multiresolution image of low resolution, the entire object can be set as the local region, for example, even if the image of the object is interrupted by an obstacle located on the near side; therefore, the object can be detected well.

The image processor according to the present invention is preferably configured as follows: the object detecting unit extracts edges in the local region and combines edges on the basis of color information around the edges to detect the object.

According to this invention, the image processor is configured to extract edges in the local region and combine edges on the basis of the color information around the edges, whereby it is able to combine the edges of the object even if the image of the object is interrupted by an obstacle in the local region, and is thus able to appropriately detect the object.

The image processor according to the present invention is also preferably configured as follows: the local region extracting unit extracts a position where the correlation value is a local maximum or minimum, as the position of the local region.

According to this invention, the image processor is configured to extract the position where the correlation value is a local maximum or minimum, as the position of the local region, whereby it is able to extract a local characteristic portion and thus to accurately detect the object.

The image processor according to the present invention is also preferably configured as follows: the local region extracting unit sets the local region larger with decrease in the resolution of the multiresolution image.

According to this invention, the image processor is configured to set the local region larger with decrease in the resolution of the multiresolution image, whereby it is able to detect a large object, based on the multiresolution image of low resolution and to detect a small object, based on the multiresolution image of high resolution. Therefore, the image processor is able to perform appropriate detection, regardless of the size of the object.

The image processor according to the present invention is also preferably configured as follows: the local region extracting unit sets the size of the local region in accordance with intensities of feature points in the local region, a number of other local regions existing in the local region, or similarities of color information in the local region.

According to this invention, the image processor is configured to set the size of the local region in accordance with the intensities of feature points in the local region, the number of other local regions existing in the local region, or the similarities of the color information in the local region, whereby it is able to adjust the size of the local region according to a probability that the local region is a target region, and is thus able to set the local region in an appropriate range. Accordingly, the image processor is able to set a large local region if the target region is highly probably large, and to combine contour lines of the object without omission. Furthermore, the image processor is able to recognize the object by edge combining or the like even if the object is separated by an obstacle.

The image processor according to the present invention is able to increase the image processing speed while maintaining the object recognition accuracy.

DESCRIPTION OF THE PREFERRED EMBODIMENTS

An embodiment of the image processor according to the present invention will be described below in detail with reference to the accompanying drawings. In the description of the drawings the same elements will be denoted by the same reference symbols, without redundant description.

Figure 1:
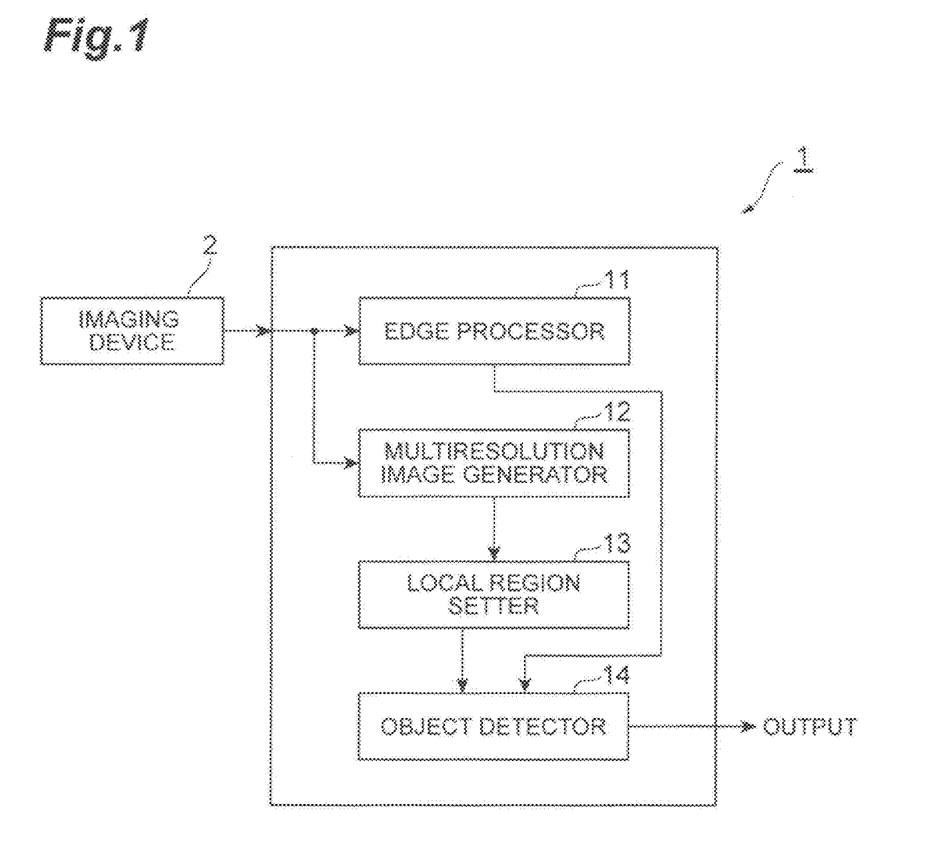
FIG. 1 is a schematic view of a configuration of an image processor according to an embodiment of the present invention.

FIG. 1 shows a schematic diagram of a configuration of the image processor according to the embodiment of the present invention.

As shown in FIG. 1, the image processor 1 of the present embodiment is a device that performs image processing for an input image fed from an imaging device 2 or the like to detect an object in the input image, and is constructed with an edge processor 11, a multiresolution image generator 12, a local region setter 13, and an object detector 14. The input image fed into the image processor 1 may be an image fed from any other device than the imaging device 2 such as a camera, and may also be, for example, an image recorded in a memory or the like.

The edge processor 11, multiresolution image generator 12, local region setter 13, and object detector 14 are implemented, for example, by a computer system including a CPU, a ROM, and a RAM and loaded with a program to exercise the functions of the respective units.

The edge processor 11 is an edge processing device that extracts edges in the input image fed into the image processor 1 and that performs segmentation of the extracted edges. For example, the edge processor 11 performs the extraction of edge parts by applying a Canny filter, a Sobel filter, or the like to the input image. Then the edge processor 11 performs the segmentation of the extracted edges by joining them using intersecting points and sharply bent points as nodes.

The multiresolution image generator 12 is a device that generates a plurality of multiresolution images of different resolutions from the input image and that functions as a multiresolution image acquiring unit. For example, the multiresolution image generator 12 sets Gaussian filters using the Gaussian function (Gauss function), for the respective resolutions and applies each of those Gaussian filters to the input image, thereby generating the plurality of multiresolution images of different resolutions from the input image.

The local region setter 13 functions as a local region extracting unit that sets a local region in the input image, and is configured to set a correlation evaluation function for each of the multiresolution images, calculate a correlation value between the correlation evaluation function and each pixel in the multiresolution image, extract a position of a local region on the basis of the correlation value, and set a size of the local region according to the resolution of the multiresolution image.

For example, the correlation evaluation function to be used can be the function used in the generation of the multiresolution images, i.e., the Gaussian function. The correlation evaluation function is set for each multiresolution image by changing a parameter and, for example, a correlation evaluation function with a greater amplitude is used for a multiresolution image of a lower resolution.

The extraction of the position of the local region is carried out, for example, by performing fitting of the correlation evaluation function to the multiresolution image and calculating the correlation value indicating a degree of coincidence in the fitting. Then a position where the correlation value is a local maximum or minimum in the multiresolution image is extracted as the position of the local region.

The setting of the size of the local region is preferably performed so that the local region is set larger with decrease in the resolution of the multiresolution image. For example, preferably, the local region is set larger with decrease in the resolution of the multiresolution image and the local region is set gradually smaller with increase in the resolution. In this case, preferably, the size of the local region is adjusted according to intensities of feature points in the local region or according to the number of other local regions existing in the local region of interest.

The object detector 14 functions as an object detecting unit that detects an object in the local region, and is configured, for example, to extract edges in the local region, select edges on the basis of color information around the edges, and combine the selected edges, thereby detecting an object.

The following will describe the operation of the image processor according to the present embodiment and an image processing method according to the present embodiment.

Figure 2:
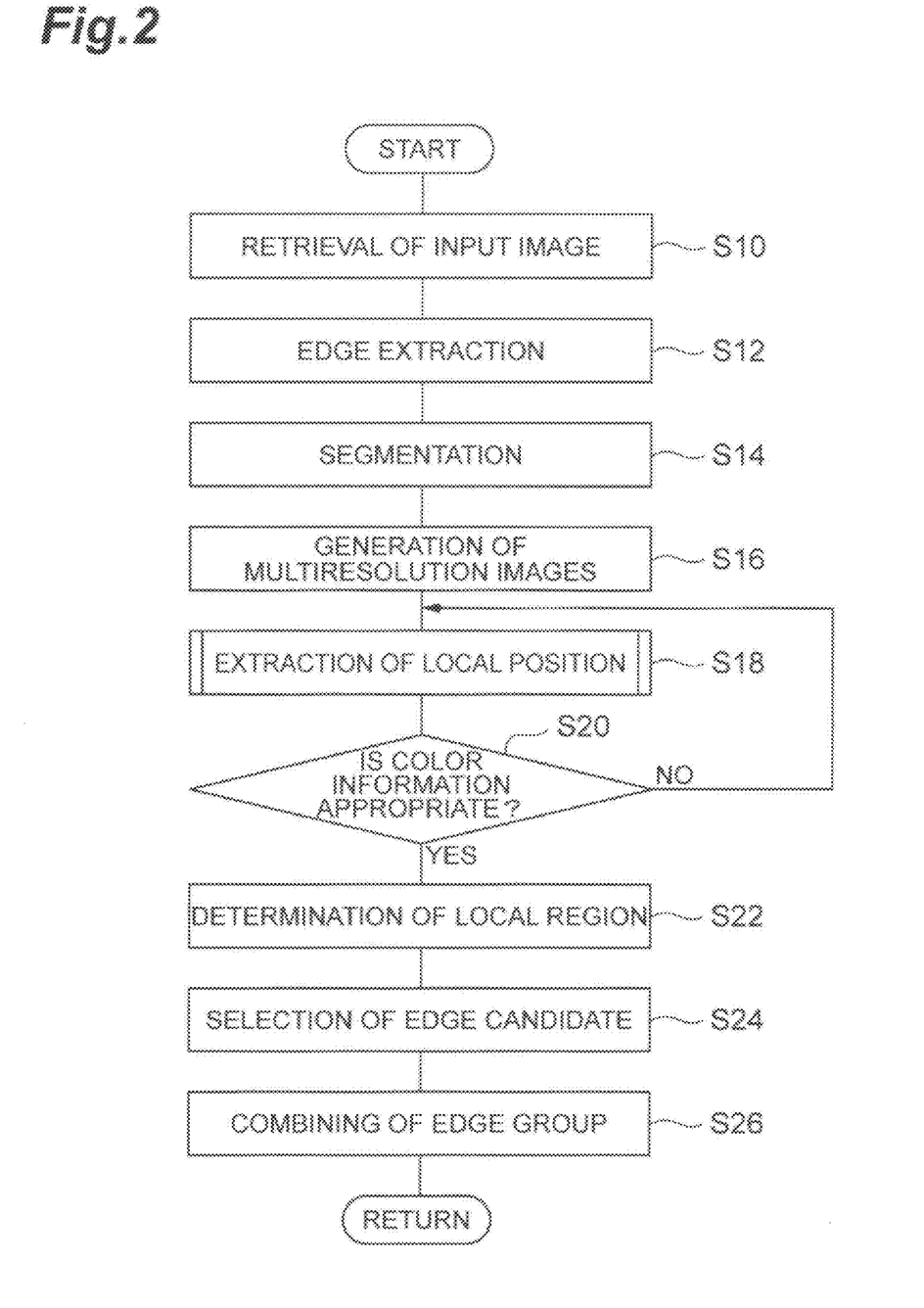
FIG. 2 is a flowchart showing an operation of the image processor shown in FIG. 1 and an image processing method according to an embodiment of the present invention.

FIG. 2 is a flowchart showing the operation of the image processor and the image processing method according to the present embodiment. The control processing in FIG. 2 is repeatedly executed, for example, in a preset period.

First, as in S10 of FIG. 2, an input image is retrieved. This input image retrieving process is carried out, for example, by importing an image taken by the imaging device 2 and storing it into a memory. The input image does not always have to be one taken in real time, but may be one recorded in advance and retrieved.

Then the image processor moves to S12 to perform an edge extraction process. The edge extraction process is a process of extracting edge parts in the input image and is implemented, for example, by subjecting the input image to filtering with an edge extraction filter such as the Sobel filter by the edge processor 11. Then the image processor moves to S14 to perform a segmentation process. The segmentation process is a process of combining related edges among the edges extracted in S12, to implement segmentation, and is carried out by the edge processor 11. This segmentation process may be carried out by combining the related edges using intersecting points of edges and sharply bent points of edges as nodes.

Figure 3:
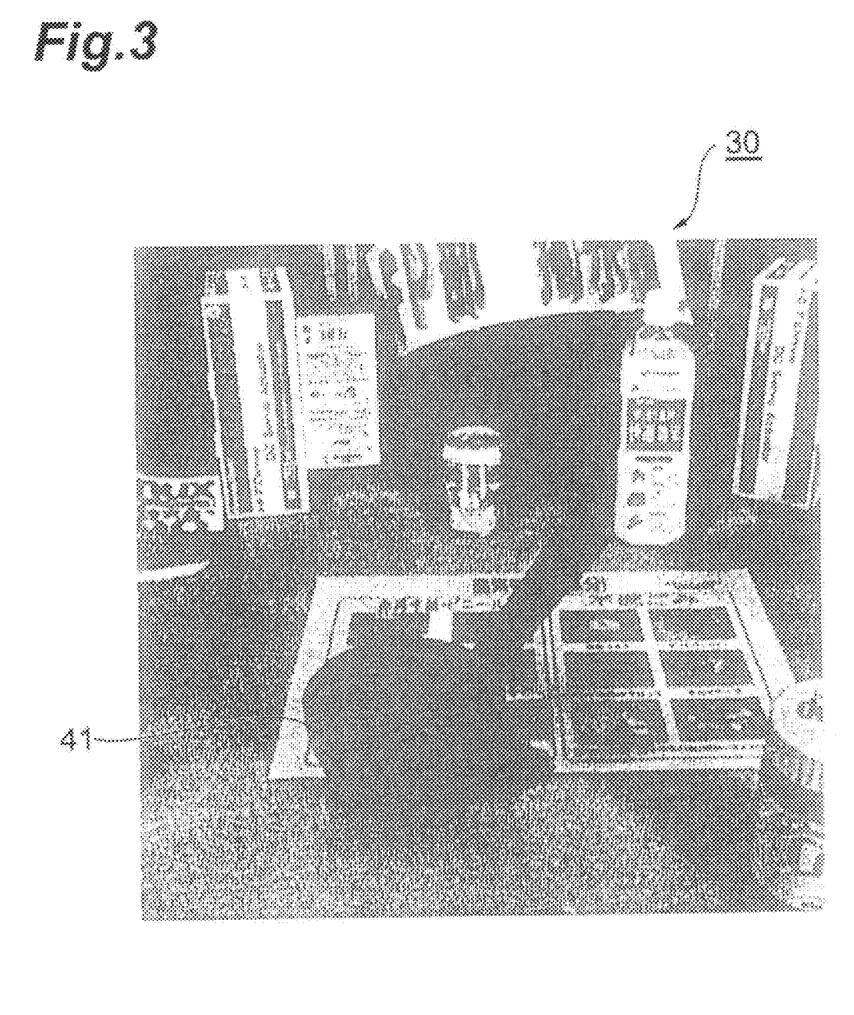
FIG. 3 is an illustration to illustrate an input image.
Figure 4:
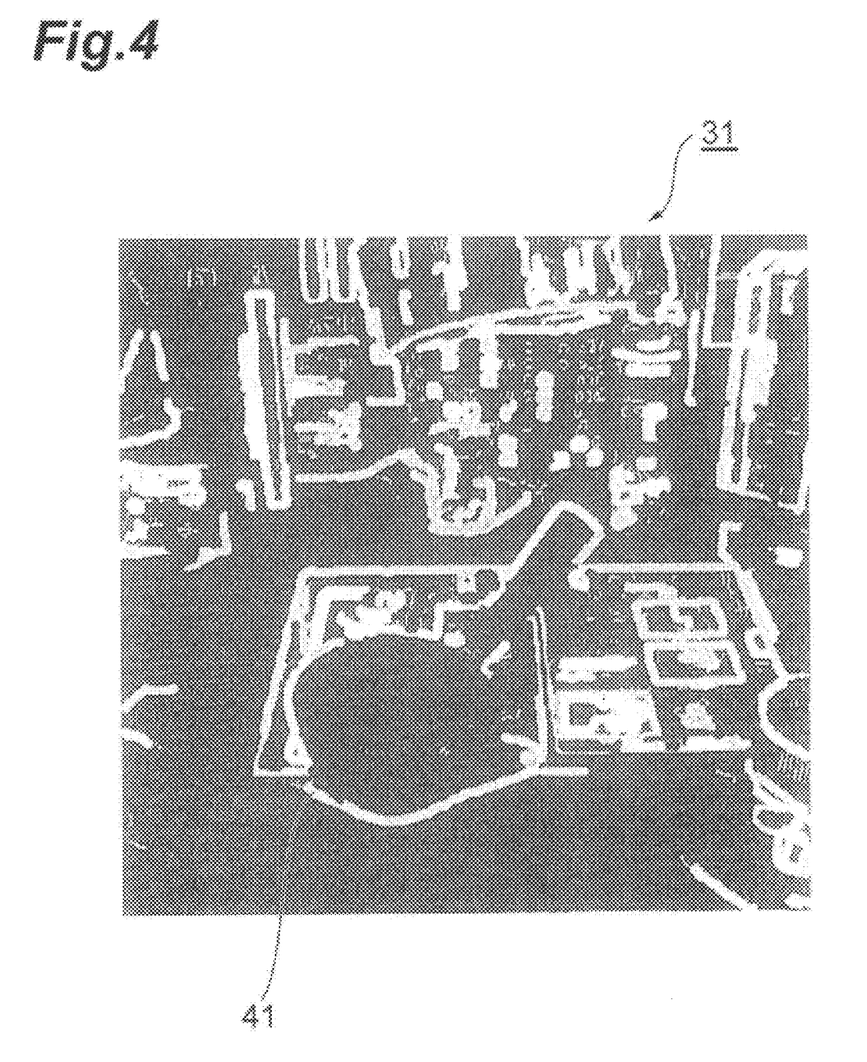
FIG. 4 is an illustration to illustrate an image resulting from edge processing.

FIG. 3 shows an illustration to illustrate an input image and FIG. 4 an illustration to illustrate an image resulting from the segmentation. As shown in FIG. 3, the input image 30 is an image obtained by photography of a room interior, in which a teapot 41 is imaged as an object to be extracted.

As shown in FIG. 4, the image 31 resulting from the edge extraction and segmentation is one in which portions with great luminance change are extracted as edges and in which the edges are segmented and enhanced. The contour of the teapot 41 is also extracted as edges, which are combined to be segmented.

It is noted that the edge extraction process of S12 and the segmentation process of S14 may be executed by a separate control processing different from the sequential control processing in FIG. 2.

Then the image processor moves to S16 in FIG. 2 to perform a process of generating multiresolution images. The multiresolution image generating process is a process of generating a plurality of multiresolution images of different resolutions from the input image 30 and is carried out by feeding the image data of the input image 30 into the multiresolution image generator 12. The plurality of multiresolution images of different resolutions are generated from the input image 30, for example, by setting the Gaussian function with variation in a parameter to change the resolution of the input image 30 and applying the Gaussian function as a Gaussian filter to the input image. The generation of multiresolution images may be implemented by any technique other than the above.

Then the image processor moves to S18 to carry out a position extracting process of the local region. This position extracting process is a process of extracting a position of the local region indicating a characteristic portion in the input image 30, and is carried out by setting a correlation evaluation function for each of the multiresolution images generated in S16, calculating a correlation value between the correlation evaluation function and each of pixels in the multiresolution image, and extracting the position of the local region on the basis of the correlation value.

Figure 5:
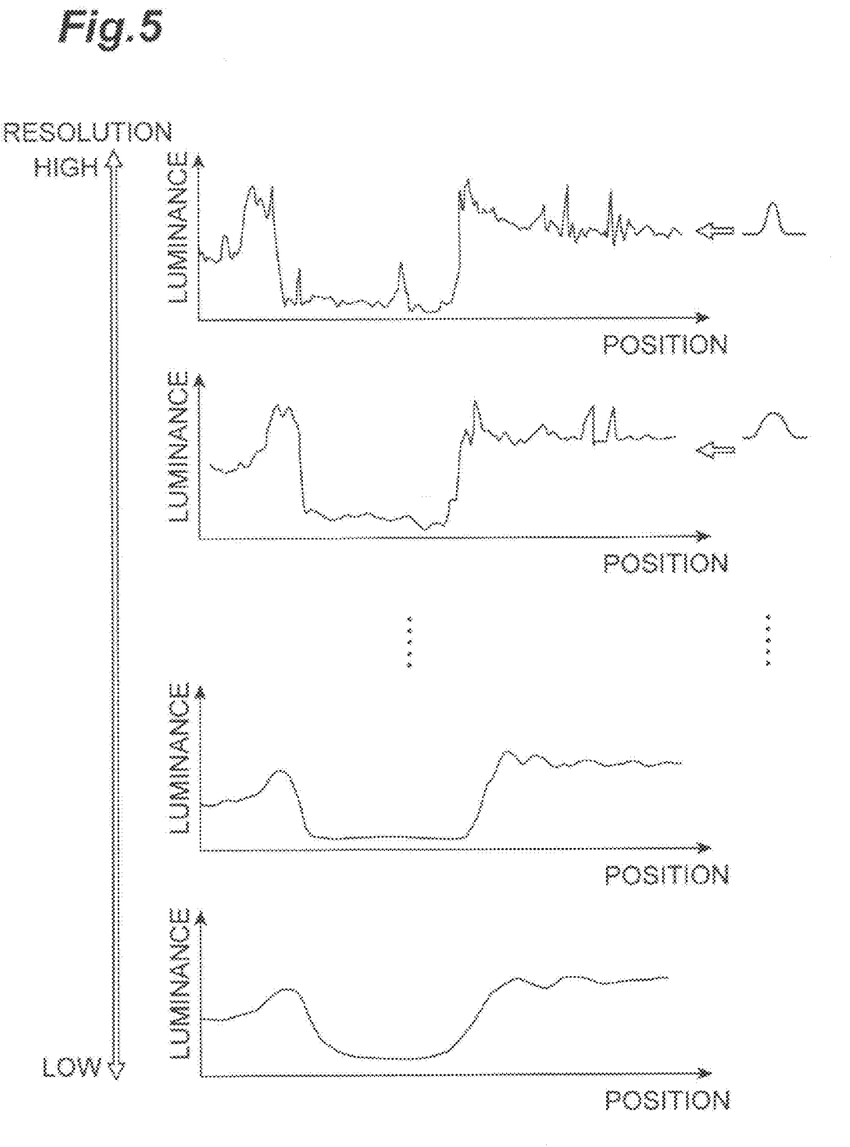
FIG. 5 is an illustration to illustrate a process of extracting a position of a local region in the image processor shown in FIG. 1.

The correlation evaluation function is a function for calculating the correlation value by fitting with the multiresolution image and is, for example, the function used in the generation of the multiresolution images, i.e., the Gaussian function. The calculation of correlation value is carried out, for example, as shown in FIG. 5, by performing fitting with the correlation evaluation function for pixels in each multiresolution image and calculating a fitting degree in the fitting as a correlation value. A position where the calculated correlation value is a local maximum or minimum is extracted as the position of the local region.

Then the image processor moves to S20 to determine whether the surrounding color information is appropriate at the position of the local region thus extracted. For example, it is carried out by determining whether the surrounding color information at the extracted position of the local region is color information with similarity over a predetermined level. When it is determined in S20 that the surrounding color information is not appropriate at the extracted position of the local region, the image processor returns to S18.

On the other hand, when it is determined in S20 that the surrounding color information is appropriate at the extracted position of the local region, a size of the local region is set to determine the local region (S22). For example, the size of the local region is set according to the resolution of the multiresolution image. In this case, the local region is preferably set to be larger with decrease in the resolution of the multiresolution image. By setting the size of the local region in this manner, it becomes feasible to detect a large object on the basis of the multiresolution image of low resolution and to detect a small object on the basis of the multiresolution image of high resolution. Therefore, appropriate detection can be performed irrespective of the size of the object.

The size of the local region is also preferably set according to intensities of feature points in the local region (fitting degrees with the Gaussian function), the number of other local regions existing in the local region of interest, or similarities of the color information in the local region. In this case, the size of the local region may be adjusted according to some of the feature point intensities in the local region, the number of other local regions existing in the local region, or the similarities of color information in the local region; or the size of the local region may be adjusted by taking into account all of the feature point intensities in the local region, the number of other local regions existing in the local region, or the similarities of color information in the local region.

The size of the local region may be adjusted as follows: the local region is set larger as the feature point intensity in the local region becomes higher; the local region is set larger as the number of other local regions existing in the local region increases; the local region is set larger as the similarity of color information in the local region becomes larger.

When the size of the local region is set according to the feature point intensities in the local region, the number of other local regions existing in the local region, or the similarities of color information in the local region, the size of the local region can be adjusted according to a probability that the local region is a target region, and it thus becomes feasible to set the local region in an appropriate range. Therefore, when the target region is highly probably large, the local region can be set large so as to implement integration of the contour of the object without omission. Furthermore, it becomes feasible to recognize an object, based on the edge combining and others, even if the object is separated by an obstacle.

Figure 6:
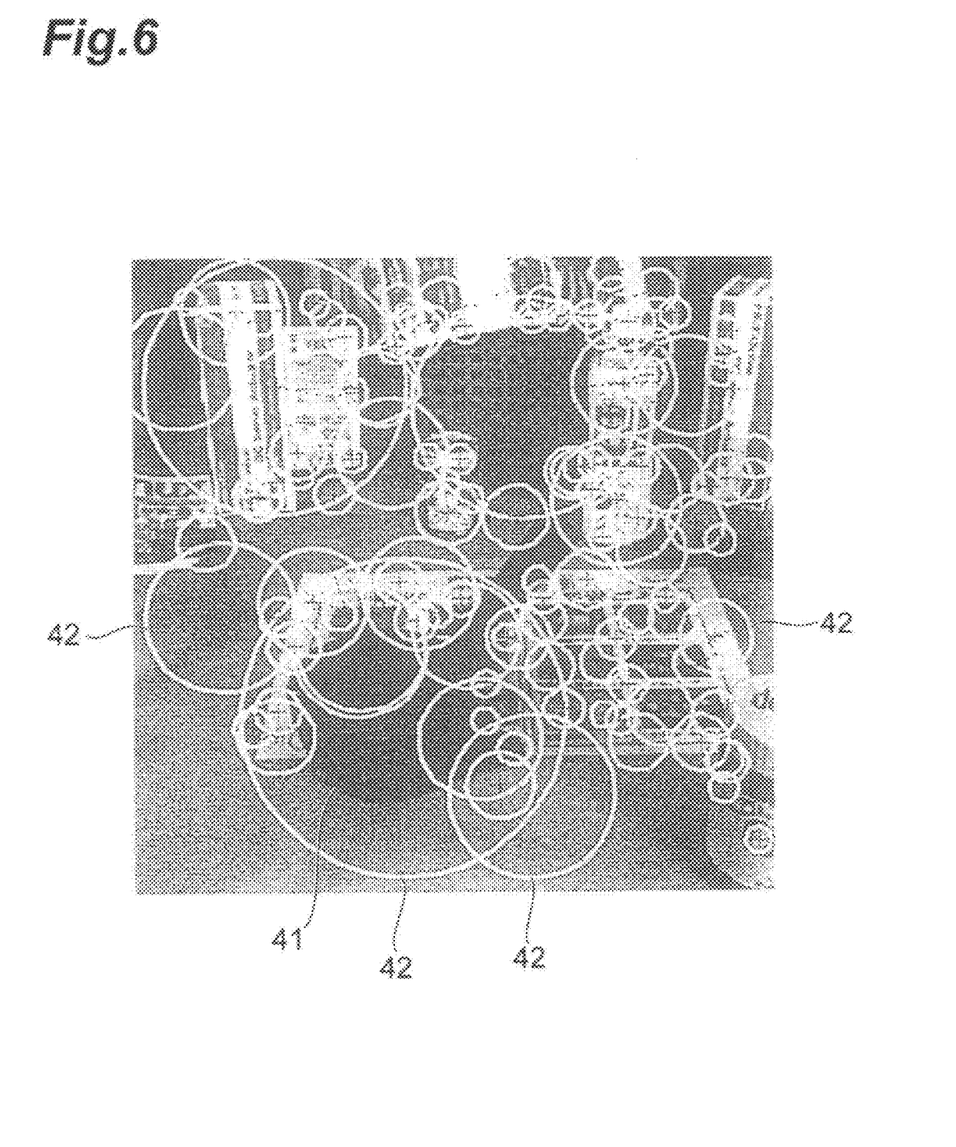
FIG. 6 is an illustration to illustrate a local region setting process in the image processor shown in FIG. 1.

FIG. 6 shows an image in which local regions are set. As shown in FIG. 6, many local regions 42 as candidates for an object are indicated by circles. The sizes of the local regions 42 are set by different radii of the circles. The sizes of the local regions 42 may also be indicated by any shape other than the circles. In this case, it is preferable to adopt a shape according to the shape of the object to be detected.

Then the image processor moves to S24 in FIG. 2 to perform a selecting process of edge candidates. The selecting process of edge candidates is a process of selecting a local region assumed to be an object to be detected, out of the plurality of local regions thus set, and selecting edge candidates indicating the object.

The selection of local region is carried out, for example, by determining whether a local region is an object to be detected, based on a gradient distribution of edge in the local region (the presence or absence of a closed curve of edge, deviation of edge, or the like). In this case, the selection process is preferably started from the local region extracted from the multiresolution image of the lowest resolution. The selection is carried out in the following manner: a large local region extracted from a multiresolution image of a low resolution is first selected as a candidate for selection; if there is no object in the selected local region, a local region extracted from a multiresolution image of a resolution higher than it is then selected as a candidate. By selecting the local region in this manner, where there is a deviation in a gradient distribution of edge, it becomes feasible to select an appropriate local region while avoiding grouping of the edges in the associated resolution. The selection of local region may also be carried out based on the color information of local region. For example, the local region may be selected as one with color information close to that of the object. The selection of edge candidates is carried out by extracting edges in the selected local region.

Then the image processor moves to S26 to perform a combining process of edge group. The edge group combining process is a process of combining edges on the basis of color information around the edges extracted in S24. This process makes the contour of the object clear and thus enables recognition of the object.

Figure 7:
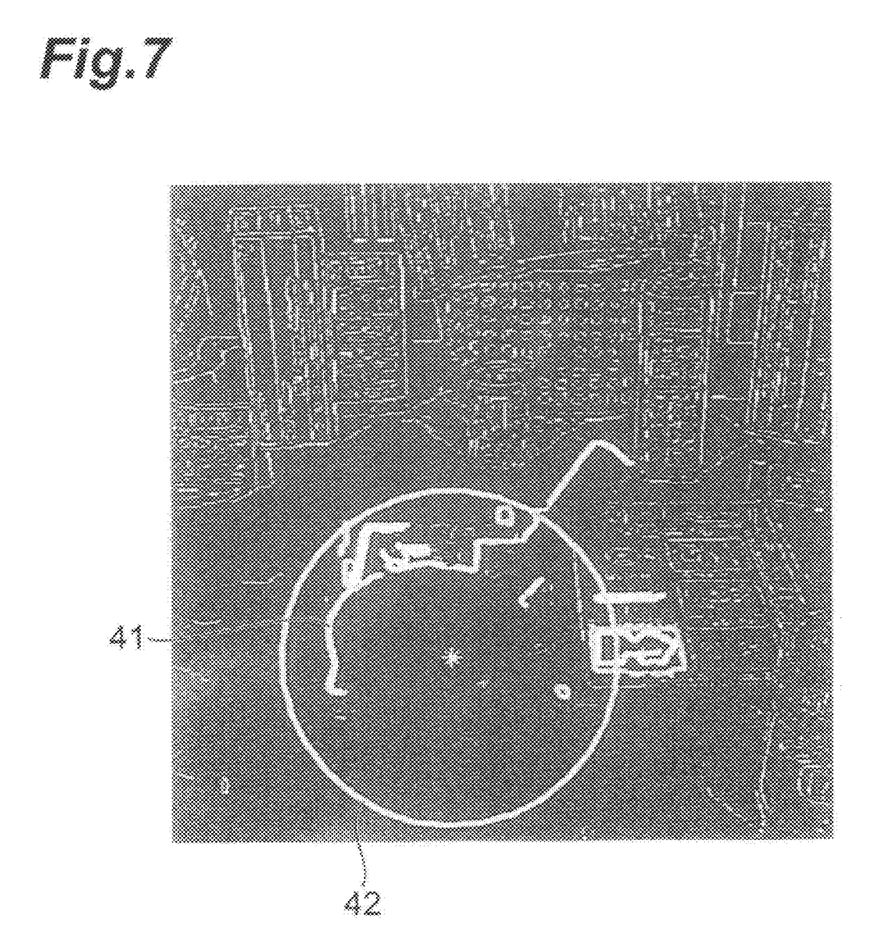
FIG. 7 is an illustration to illustrate an image resulting from selection of a local region and extraction of edges.
Figure 8:
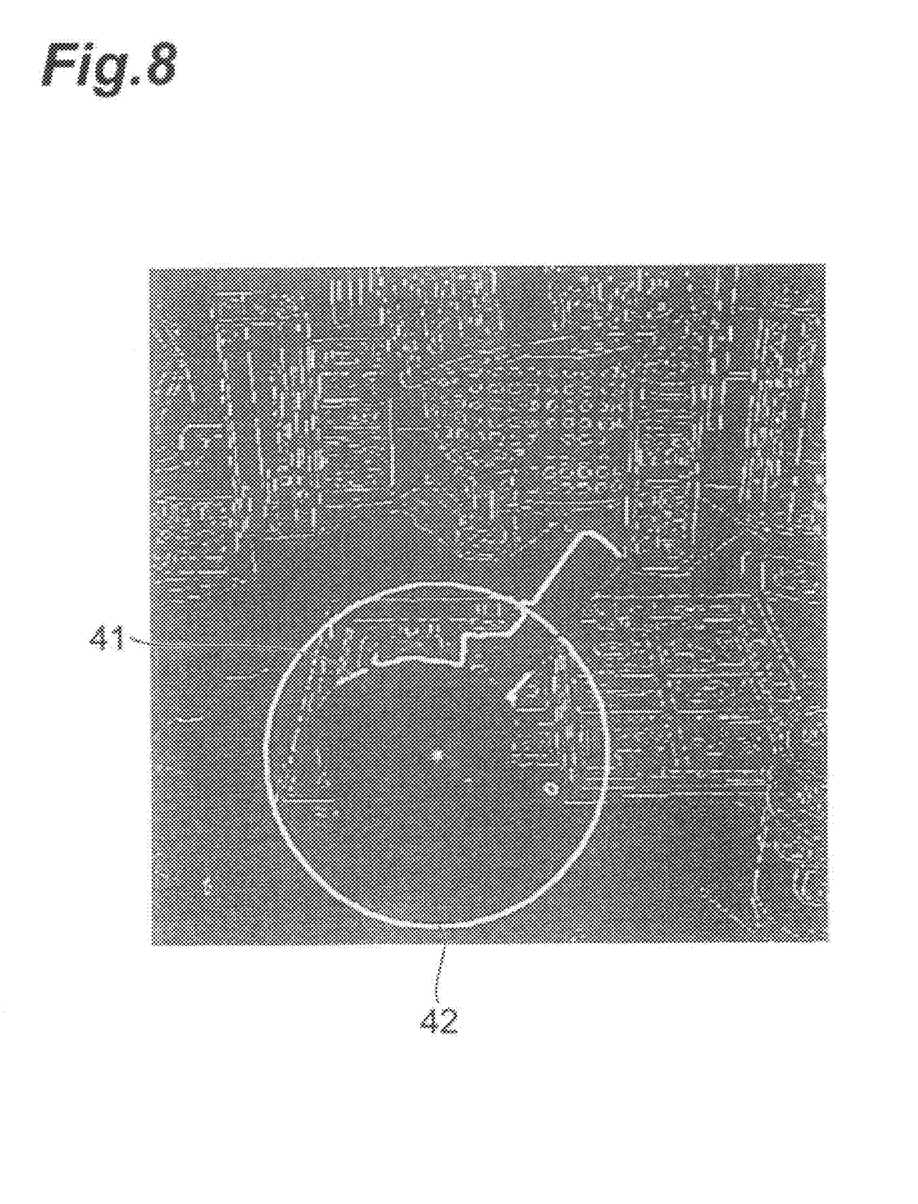
FIG. 8 is an illustration to illustrate an image resulting from edge combining.

FIG. 7 shows an image resulting from the selection of the local region and the edge extraction and FIG. 8 an image resulting from the edge combining. As shown in FIG. 7, the edges extracted are those around the selected local region 42. The edges of the teapot 41 being the object to be extracted are also extracted. Then the edge combining results in combining only the edges of the teapot 41, as shown in FIG. 8. The object can be recognized by detecting the edges in this manner. The object can be recognized, for example, by matching the combined edges with the contour of the object recorded in advance. After completion of the edge combining process in S24 in FIG. 2, the sequential control processing is terminated.

Figure 9:
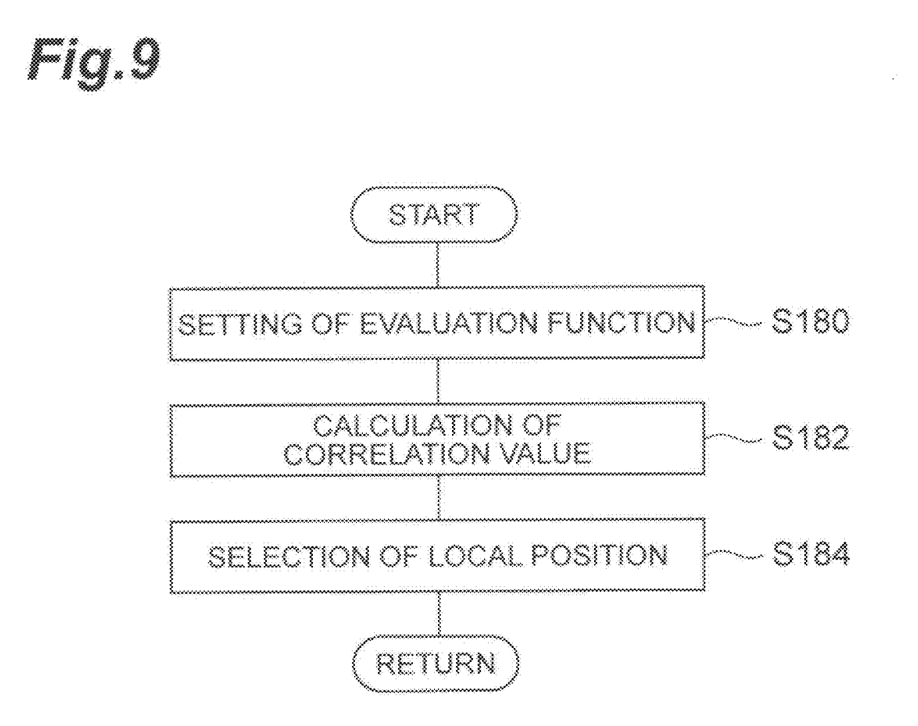
FIG. 9 is a flowchart showing an example of position extraction processing of a local region in the image processor shown in FIG. 1.

FIG. 9 is a flowchart showing an example of the position extracting process of the local region.

The position extracting process of local region in FIG. 9 is a specific example of the process of S18 in FIG. 2. This position extracting process of local region first includes a setting process of the correlation evaluation function as shown in S180 in FIG. 9. This setting process of the correlation evaluation function is a process of setting the correlation evaluation function for extraction of the position of the local region indicating a characteristic portion in the input image 30. For example, the Gaussian function is used as the correlation evaluation function and the correlation evaluation function is set for each of the multiresolution images of respective resolutions. At this time, σ as a parameter of the correlation evaluation function may be the one used in the generation of multiresolution images. The correlation evaluation function may be any function other than the Gaussian function.

Then the image processor moves to S182 to perform a calculation process of correlation value. The correlation value calculating process is a process of calculating a correlation value with the correlation evaluation function for each of pixels in the input image 30. For example, Eq (1) below is used as an expression to calculate the correlation value C(x,y) with the Gaussian function G for each pixel P(x,y) in the input image 30.

$$C(x, y) = \frac{\sum_{i=x}\sum_{j=y} \text{Im}(i, j) \cdot G(i, j)}{\sqrt{\sum_{i=x}\sum_{j=y} \text{Im}(i, j)^2 \times \sum_{i=x}\sum_{j=y} G(i, j)^2}} \quad (1)$$

Then the image processor moves to S184 to perform a selecting process of a position of a local region. The selecting process of the position of the local region is a process of selecting the position of the local region, based on the correlation value C(x,y) with the Gaussian function G for each pixel P(x,y) in the input image 30. For example, a position where the correlation value C calculated in S182 is a local maximum or minimum is selected as the position of the local region. After completion of the process of S184, the sequential control processing of the position extracting process of the local region is terminated.

As described above, the image processor and image processing method of the present embodiment permit are able to extract the local region at the appropriate position and in the appropriate range for the characteristic portion in the input image in the extraction of the object in the input image by acquiring the multiresolution images from the input image, calculating the correlation value with the correlation evaluation function for each pixel in the multiresolution image, extracting the position of the local region on the basis of the correlation value, and setting the size of the local region according to the resolution of the multiresolution image. For this reason, the target range is appropriately limited and the object is quickly detected without deterioration of accuracy.

For example, supposing the edges and contour of the object are detected by a technique of setting small regions in a fixed size in the input image and combining some regions on the basis of color information, the throughput becomes approximately 100 times, in order to achieve the detection accuracy equivalent to that of the image processor of the present embodiment, and it leads to failure in quick processing. In contrast to it, the image processor of the present embodiment is configured to set the local region at the appropriate position and in the appropriate range for the characteristic portion in the input image and thereby to appropriately limit the target range; therefore, the throughput is reduced for the object detection and the image processor is able to quickly perform the detection of the object without deterioration of accuracy.

When the object detection is carried out by also setting the local region in the multiresolution image of low resolution, the entire object can be set as a local region, for example, even if the image of the object is interrupted by an obstacle located on the near side, and the object is successfully detected.

Figure 10:
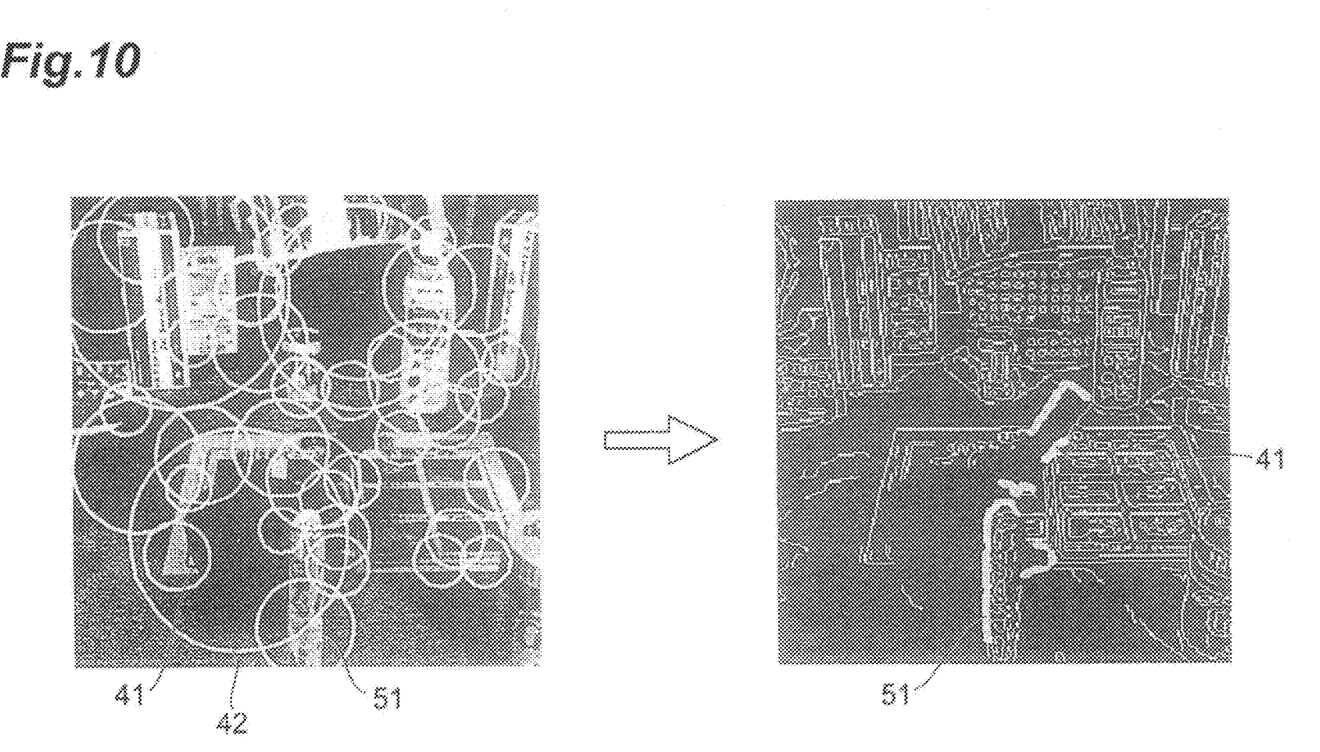
FIG. 10 is an illustration to illustrate an object detection function in the image processor shown in FIG. 1.

For example, in a case where an obstacle 51 is located in front of the teapot 41 as a detection object, as shown in FIG. 10 (A), the local region 42 is set at the position of the teapot 41. The edge of the obstacle 51 is also extracted as an edge around the local region 42, as shown in FIG. 10 (B), but such an edge can be eliminated based on the color information or the like. For this reason, the object can be recognized by combining only the edges of the object to be detected.

Since the image processor of the present embodiment is configured to extract edges in the local region and combine edges on the basis of the color information around the edges, it is able to combine the edges of the object even if the image of the object is interrupted by an obstacle in the local region, whereby the object is appropriately detected.

In the image processor of the present embodiment, the position where the correlation value between the correlation function and each pixel in the multiresolution image is a local maximum or minimum is extracted as the position of the local region; therefore, a local characteristic portion is successfully extracted, and the object detection is carried out with accuracy.

Since the image processor of the present embodiment is configured to set the local region larger with decrease in the resolution of the multiresolution image, it is feasible to detect a large object, based on the multiresolution image of low resolution, and to detect a small object, based on the multiresolution image of high resolution. Therefore, it becomes feasible to perform appropriate detection, irrespective of the size of the object.

Figure 11:
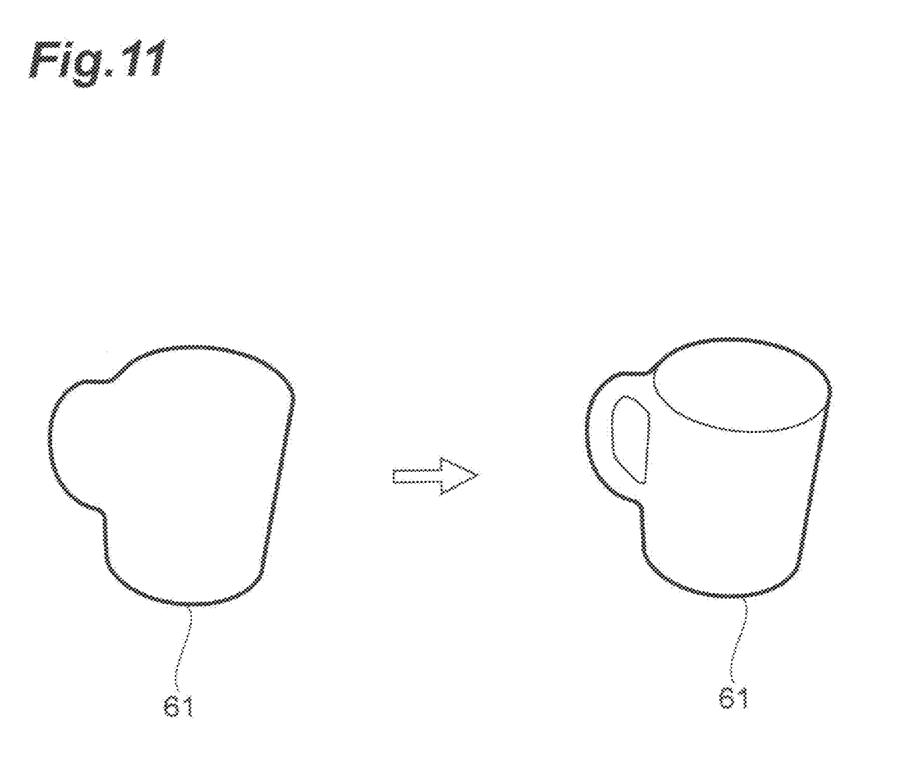
FIG. 11 is an illustration to illustrate the object detection function in the image processor shown in FIG. 1.

In the image processor of the present embodiment, the selection of the local region is preferably started from the local region extracted from the multiresolution image of the lowest resolution. For example, the selection is carried out as follows: a large local region extracted from a multiresolution image of a low resolution is first selected as a candidate for selection; if there is no object in the local region, a local region extracted from a multiresolution image of a resolution higher than it is then selected as a candidate for selection. By selecting the local region in this manner, it becomes feasible to select an appropriate local region while avoiding grouping of edges in the pertinent resolution if there is a deviation in the gradient distribution of edge. As shown in FIG. 11, a contour of an outer border of object 61 is first detected and thereafter the inside of the contour is detected; whereby the edges can be extracted without omission of a fine edge. Therefore, the object recognition accuracy is enhanced.

Furthermore, when the size of the local region is set according to the feature point intensities in the local region, the number of other local regions existing in the local region, or the similarities of color information in the local region, the size of the local region can be adjusted according to the probability that the local region is a target region, whereby the local region is set in an appropriate range. Therefore, when the target region is highly probably large, the local region is set large and the contour of the object is successfully integrated without omission. It is also feasible to recognize the object, based on the edge combining or the like, even if the object is separated by an obstacle.

The above-described embodiment shows just an example of the image processor according to the present invention. It should be noted that the image processor according to the present invention is not limited to the image processor according to the above embodiment, but the image processor according to the embodiment may be modified without departing from the scope of claims that follows, or may be applicable to the other image processing apparatus.

What is claimed is:

1. An image processor comprising:
a multiresolution image acquiring unit to acquire a plurality of multiresolution images of different resolutions from an input image;
a local region extracting unit that sets a correlation evaluation function for each of the multiresolution images, the local region extracting unit calculates a correlation value between the correlation evaluation function and each pixel in the multiresolution image, the local region extracting unit extracts a position of a local region, based on the correlation value, and the local region extracting unit sets a size of the local region according to the resolution of the multiresolution image and intensities of feature points in the local region; and
an object detecting unit to detect an object in the local region;
wherein the object detecting unit extracts edges in the local region and combines edges on the basis of color information around the edges to detect the object.

2. The image processor according to claim 1, wherein the local region extracting unit extracts a position where the correlation value is a local maximum or minimum, as the position of the local region.

3. The image processor according to claim 1, wherein the local region extracting unit sets the local region larger with decrease in the resolution of the multiresolution image.

4. An image processor comprising:
a multiresolution image acquiring unit to acquire a plurality of multiresolution images of different resolutions from an input image;
a local region extracting unit that sets a correlation evaluation function for each of the multiresolution images, the local region extracting unit calculates a correlation value between the correlation evaluation function and each pixel in the multiresolution image, the local region extracting unit extracts a position of a local region, based on the correlation value, and the local region extracting unit sets a size of the local region according to the resolution of the multiresolution image and a number of other local regions existing in the local region; and
an object detecting unit to detect an object in the local region;
wherein the object detecting unit extracts edges in the local region and combines edges on the basis of color information around the edges to detect the object.

5. The image processor according to claim 4, wherein the local region extracting unit extracts a position where the correlation value is a local maximum or minimum, as the position of the local region.

6. The image processor according to claim 4, wherein the local region extracting unit sets the local region larger with decrease in the resolution of the multiresolution image.

7. An image processor comprising:
a multiresolution image acquiring unit to acquire a plurality of multiresolution images of different resolutions from an input image;
a local region extracting unit that sets a correlation evaluation function for each of the multiresolution images, the local region extracting unit calculates a correlation value between the correlation evaluation function and each pixel in the multiresolution image, the local region extracting unit extracts a position of a local region, based on the correlation value, and the local region extracting unit sets a size of the local region according to the resolution of the multiresolution image similarities of color information in the local region; and
an object detecting unit to detect an object in the local region;
wherein the object detecting unit extracts edges in the local region and combines edges on the basis of color information around the edges to detect the object.

8. The image processor according to claim 7, wherein the local region extracting unit extracts a position where the correlation value is a local maximum or minimum, as the position of the local region.

9. The image processor according to claim 7, wherein the local region extracting unit sets the local region larger with decrease in the resolution of the multiresolution image.

* * * * *